Figure 1:
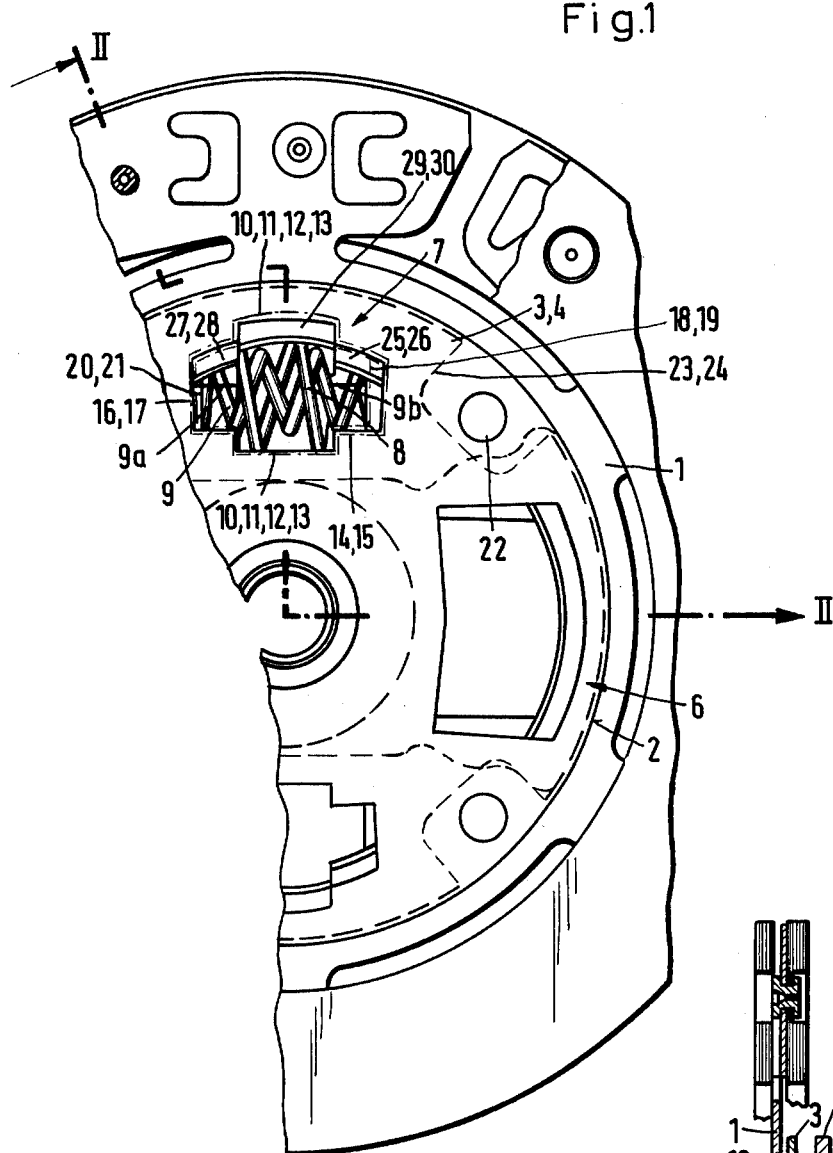

United States Patent [19]
Maucher et al.

[11] 4,144,959
[45] Mar. 20, 1979

[54] CLUTCH DISK ASSEMBLY

[75] Inventors: Paul Maucher, Sasbach; Albert Birk, Bühl-Vimbuch, both of Fed. Rep. of Germany

[73] Assignee: LuK Lamellen und Kupplungsbau GmbH, Bühl, Fed. Rep. of Germany

[21] Appl. No.: 774,944

[22] Filed: Mar. 7, 1977

[30] Foreign Application Priority Data

Mar. 6, 1976 [DE] Fed. Rep. of Germany ....... 2609418

[51] Int. Cl.² .............................................. F16D 3/14
[52] U.S. Cl. ................................................ 192/106.2
[58] Field of Search ............................ 64/27 C, 27 S; 192/106.1, 106.2, 107 C

[56] References Cited

U.S. PATENT DOCUMENTS

3,556,273  1/1971  Maucher ........................... 192/106.2

FOREIGN PATENT DOCUMENTS

2325181  12/1973  Fed. Rep. of Germany ........ 192/106.2

*Primary Examiner*—Gerald A. Dost
*Attorney, Agent, or Firm*—Herbert L. Lerner

[57] ABSTRACT

In a clutch disk assembly having two structural units formed with window-shaped cutouts, at least two coaxially disposed force-storage devices received in the cutouts and braced against the structural units so as to afford limited torsional play of the structural units relative to one another, one of the structural units including two lateral disks mutually spaced-apart from one another in axial direction of the clutch disk assembly, the other of the structural units including at least one disk-like member disposed in the axial space between the two lateral disks, the two force storage devices includes a radially inner and a radially outer force storer, the radially inner force storer extending along the length of the radially outer force storer and, as viewed in circumferential direction of the lateral disks, having a portion thereof projecting beyond at least one end of the radially outer force storer, the cutouts being defined by contour portions of the two structural units conforming both to the radially outer force storer as well as to the portion of the radially inner force storer projecting beyond the end of the radially outer force storer, the contour portions of the two structural units forming a guide both in axial and radial direction for both of the force storers.

5 Claims, 2 Drawing Figures

CLUTCH DISK ASSEMBLY

The invention relates to clutch disk assemblies such as have become known from U.S. Pat. No. 2,920,733 or French Pat. No. 1,328,726, and wherein a limited amount of torsional play between two structural units, such as a hub body and a friction lining carrier, is afforded against the action of force storage devices braced in cutouts formed in the structural units. In such clutch disk assemblies, one of the structural units which is twistable or rotatable relative to the other, includes two lateral disks, and the other structural unit is disposed in an axial space between the two lateral disks. In the clutch disk assembly that has become known from the foregoing U.S. patent, one lateral disk is the lining carrier itself and the other lateral disk is connected in a torsion-proof manner to the lining carrier. The other structural unit, namely, the flange associated with the hub body, is disposed between the two lateral disks. In contrast to the clutch disk assembly construction of the foregoing U.S. patent in the clutch disk assembly that has become known from the hereinafore mentioned French Patent, two lateral disks are connected to the hub body in a torsion-proof manner and form one structural unit, while the other structural unit is the lining carrier disk which is located between the two lateral disks.

From the clutch disks disclosed in the hereinaforementioned patents, it has further become known to dispose two springs concentrically or coaxially one within the other i.e. telescopically, in order to attain a large torsion angle or high moment of torque when the dimensions are optimal. In order, furthermore, to fix the springs against movement in axial direction as well as in radial direction in the centrifugal force reactions occurring due to high speeds, spring plates are provided on both sides of the compression springs in the disk of the aforementioned French patent. The spring plates are made of plastic and are formed with conical zones on which the end turns of the springs are received, and by means of which the springs are supposedly centered. It has been found, however, that such plates of plastic rapidly fail because they lack strength and because they cannot withstand the high temperatures that occur in clutches. In addition, such holding elements, even if they were made of other materials, would be expensive to manufacture and complicated to assemble. Furthermore, in the clutch disk assemblies of the two patents mentioned hereinbefore, the spring actions of the two springs which are disposed telescopically or concentrically within one another, are instituted at the same torsion angles of the structural units that are rotatable or twistable relative to one another, so that a flat characteristic is not attainable at the start of the torsion or rotation relative to one another.

It is an object of the invention to provide a clutch disk assembly which avoids the foregoing disadvantages of the heretofore known devices of the general type and which ensures secure mounting of the force storage devices and wherein one of the mutually concentric force storage devices that is provided projects beyond the other at least on one side thereof, as viewed in circumferential direction. A further object of the invention is to provide a clutch disk assembly which prevents buckling of the force storage devices and which, with simplified construction, has fewer parts and is distinguished by an easier and simpler assembly and can therefore also be produced more economically. In addition, it is an object of the invention to provide such a clutch disk assembly wherein the most varied damping characteristics are afforded.

With the foregoing and other objects in view, there is provided, in accordance with the invention in a clutch disk assembly having two structural units formed with window-shaped cutouts, at least two coaxially disposed storage devices received in the cutouts and braced against the structural units so as to afford limited torsional play of the structural units relative to one another, one of the structural units including two lateral disks mutually spaced-apart from one another in axial direction of the clutch disk assembly, the other of the structural units including at least one disk-like member disposed in the axial space between the two lateral disks, the two force storage devices comprising a radially inner and a radially outer force storer, the radially inner force storer extending along the length of the radially outer force storer and, as viewed in circumferential direction of the lateral disks, having a portion thereof projecting beyond at least one end of the radially outer force storer, the cutouts being defined by contour portions of the two structural units conforming both to the radially outer force storer as well as to the portion of the radially inner force storer projecting beyond the end of the radially outer force storer, the contour portions of the two structural units forming a holder or a guide both in axial and radial directions for both of the force storers. That is to say, the larger window-shaped cutout in the one as well as in the other structural unit merges into the smaller window-shaped cutout, whereby the force storers are centered in a relatively simple, economical and effective manner.

Although other kinds of force storage devices can be used in the invention, in the following description of one embodiment of the invention, helical springs are used as the force storers.

It is particularly advantageous in this connection that the window-shaped cutouts for the inner force storer or spring in the two outer lateral disks, as well as in the disk-shaped part disposed therebetween have a larger dimension, as seen in the circumferential direction of the disk, than that of the inner spring resulting from the maximal compression thereof. This ensures that the inner spring will remain centered even at the highest rotary speeds and for the full torsion angle of the structural units relative to each other, since the ends of the inner spring are always held by the disk parts at the portions of the inner spring projecting beyond the ends of the outer spring.

These features can be used, however, not only in such clutch disk assemblies wherein both springs become effective simultaneously, but can also be used with such springs, wherein either the outer or the inner spring is effective first and the other is subsequently effective in a succeeding angular range.

In accordance with another feature of the invention, the outer force storer has a weaker or softer characteristic than that of the inner force storer and, starting from a neutral position of the two structural units that are twistable relative to one another, the outer force storer being alone effective over a first torsional range, and the inner force storer being also effective over a succeeding torsional range. Such an embodiment can meet the requirement of a soft or weak initial characteristic in the relative rotation of the two structural units, in a particularly effective manner, since springs with a larger diameter (for a given wire gauge) are effective with less stiffness than comparable springs with a smaller diameter. In addition, such an embodiment provides an optimization of the dimensional relations since, with less stiffness of the spring of the first stage i.e. the outer spring, the spring for the second stage i.e., the inner spring, can be selected to have greater stiffness and thereby, larger outer diameters are attainable for the inner spring than if the opposite situation prevailed.

In a clutch disk assembly, the outer spring can be confined, as hereinaforedescribed by the contour portions of the one structural unit defining the cutout formed therein by a window formed in the hub flange, for example, as well as by the contour portions of the other structural unit defining the cutout formed therein i.e. by windows formed in the lining carrier and the counter-disk, for example, in such a manner that, starting at a neutral position, the outer spring becomes effective in both directions of twist or relative rotation, the outer spring, for example, being subjected to a slight prestressing in the corresponding window-shaped cutouts, and the cutouts in the lining carrier and counter disks for the inner spring being made longer than the cutout in the hub flange, as seen in the circumferential direction, respectively.

In accordance with a further feature of the invention, the part of the cutouts formed in the two lateral disks wherein the inner force storer is disposed, as viewed in circumferential direction of the clutch disk assembly, in accordance with the torsion or twist over which only the outer spring is effective, is longer than the corresponding part of the cutouts formed in the disk-like member i.e. the hub flange, in the axial space between the two lateral disks.

In accordance with an additional feature of the invention, the part of the cutouts formed in the two structural units wherein the inner force storer is disposed, as viewed in circumferential direction of the clutch disk assembly, has a length that is at least as great as the length of the inner force storer under maximal compression thereof.

Expecially in vehicles which are equipped with high-speed engines, in accordance with yet another feature of the invention, the contour portions of the two structural units located at the radially outer sides of the window-shaped cutouts are formed on at least one of the two lateral disks with vanes extending away from the respective lateral disk, the vanes including at least one radially farther outwardly disposed vane converging toward the outer force storer and at least one radially farther inwardly disposed vane converging toward the projecting portion of the inner force storer. In this especially effective manner, the retention of the force storers or springs is assured even with the aforementioned high-speed engines.

Other features which are considered as characteristics for the invention are set forth in the appended claims.

Although the invention is illustrated and described herein as embodied in a clutch disk assembly, it is nevertheless not intended to be limited to the details shown, since various modifications and structural changes may be made therein without departing from the spirit of the invention and within the scope and range of equivalents of the claims.

Figure 2:
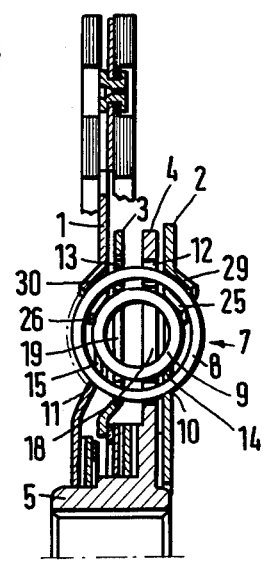

The construction and method of operation of the invention, however, together with additional objects and advantages thereof will be best understood from the following description of specific embodiments when read in connection with the accompanying drawings, in which:

FIG. 1 is a partly broken-away diagrammatic front elevational view of the clutch disk assembly according to the invention; and FIG. 2 is a cross-sectional view of FIG. 1 taken along the line II—II in the direction of the arrows.

Referring now to the figures of the drawing, there is shown a clutch disk assembly according to the invention having a construction wherein one structural unit thereof that is twistable or angularly displaceable relative to another structural unit thereof is formed of a friction lining carrier disk 1 and an opposing or counter-disk 2 which are torsion-proof with respect to one another. The other of the structural units of the clutch disk assembly that is twistable or angularly displaceable relative to the one structural unit thereof is formed of two flange parts 3 and 4 that are disposed between the lining carrier disk 1 and the counterdisk 2 and are rigid with a hub body 5 in a torsion-proof manner. Between these two structural units which are twistable or angularly displaceable relative to each other, groups 6 and 7 of springs are provided, the spring group 7 including two springs 8 and 9 that are disposed substantially concentrically or coaxially to each other. The spring 8 is disposed within four cutouts formed in the two structural units, namely in a window-shaped cutout 11 formed in the friction lining carrier disk, a window-shaped cutout 10 formed in the counterdisk, as well as in a window-shaped cutout 13 formed in the one hub flange 3 and a window-shaped cutout 12 formed in the other hub flange 4. All of the cutouts 10 to 13, at least in circumferential direction of the clutch disk assembly, are of equal size. The spring 8 has a soft characteristic and is slightly prestressed.

The spring 9 which, in the illustrated embodiment has a harder characteristic, is disposed within the spring 8, regions 9a and 9b thereof extending beyond the ends of the outer spring 8. Window-shaped cutouts are also formed in all disk parts 1, 2, 3 and 4 for the projecting regions 9a and 9b of the spring 9. Specifically, the window-shaped cutouts 14 and 15, on the one hand and 16 and 17, on the other hand, formed in the disks 1 and 2 are made longer, as viewed in the circumferential direction of the clutch disk, than the window-shaped cutouts 18 and 19, on the one hand, and 20 and 21, on the other hand, formed in the flanges 3 and 4. Accordingly, assuming that the hub 5 and the flange parts 3 and 4 are stationary, and the lining carrier disk 1 and the counterdisk 2 are rotated in either direction of rotation, relative to the hub from the indicated neutral position thereof, only the spring 8 with the softer or weaker characteristic curve is effective until the stop contours or portions of the respective disks 1 and 2 defining the window-shaped cutouts 14, 15 and 16, 17, respectively, which are effective in circumferential direction, engage the end turns of the spring 9. If the relative torsion exceeds the foregoing, the stiffer or harder spring 9 then becomes increasingly more effective until the spacer post 22, which connects the disks 1 and 2 in a conventional manner, comes into engagement with one of the stop contours or portions of the respective flanges 3 and 4 defining the cutouts 23 and 24 formed in the flanges 3 and 4, respectively. It may be advantageous if the protruding regions 9a and 9b of the spring 9 or the length of the window-shaped cutouts 18, 19, 20 or 21 in the hub parts 3 and 4, as viewed in circumferential direction of the clutch disk assembly, are at least of the same size, and preferably larger than the distance over which the inner spring 9 is compressed by the relative rotation of the two units. In this way, assurance is provided that, even for maximum rotation or torsion, the protruding ends of the spring 9 will be held by the respective portions of the disks 1 to 4, which define the window-shaped cutouts, since the spacer post 22 comes into engagement with the contours of or the parts of the hub flanges 3 and 4 defining the cutouts 23, 24.

The radially outer contours of the window-shaped cutouts 14, 15 and 16, 17 as well as the radially outer contours of the cutouts 10, 11 of the disks 1 and 2 are provided with outwardly directed vanes 25, 26 as well as 27, 28 and 29, 30, in order to ensure trouble-free guidance and support of both springs 8 and 9 at the highest rotary speeds.

As noted hereinbefore, the invention is not limited to the embodiment shown. It can also be applied in particular to clutch disk assemblies wherein the lining carrier disk is located between two disk parts that are disposed on the hub and fixed against relative rotation therewith.

There are claimed:

1. In a clutch disk assembly having two structural units formed with window-shaped cutouts, at least two coaxially disposed force-storage devices received in the cutouts and braced against the structural units so as to afford limited torsional play of the structural units relative to one another, one of the structural units including two lateral disks mutually spaced-apart from one another in axial direction of the clutch disk assembly, the other of the structural units including at least one disk-like member disposed in the axial space between the two lateral disks, the two force storage devices comprising a radially inner and a radially outer force storer, the radially inner force storer extending along the length of the radially outer force storer and, as viewed in circumferential direction of the lateral disks, having a portion thereof projecting beyond at least one end of the radially outer force storer, the cutouts being defined by contour portions of the two structural units, the cutout formed in one of the two structural units conforming both to the radially outer force storer as well as to the portion of the radially inner force storer projecting beyond the end of the radially outer force storer, the contour portions of both structural units extending in the radially inner and outer directions and forming stop contours in both axial and radial directions in both structural units for the radially outer force storer and in said one of the two structural units for the portion of the radially inner force storer projecting beyond the end of the radially outer force storer.

2. In a clutch disk assembly having two structural units formed with window-shaped cutouts, at least two coaxially disposed force-storage devices received in the cutouts and braced against the structural units so as to afford limited torsional play of the structural units relative to one another, one of the structural units including two lateral disks mutually spaced-apart from one another in axial direction of the clutch disk assembly the other of the structural units uncluding at least one disk-like member disposed in the axial space between the two lateral disks, the two force storage devices comprising a radially inner and a radially outer force storer, the radially inner force storer extending along the length of the radially outer force storer and, as viewed in circumferential direction of the lateral disks, having a portion thereof projecting beyond at least one end of the radially outer force storer, the cutouts being defined by contour portions of the two structural units, the cutout formed in one of the two structural units conforming both to the radially outer force storer as well as to the portion of the radially inner force storer projecting beyond the end of the radially outer force storer, the contour portions of the two structural units extending both in axial and radial directions and forming a guide for both of the force storers in both of said directions, the outer force storer having a weaker characteristic than that of the inner force storer and, starting from a neutral position of the two structural units that are twistable relative to one another, the outer force storer being alone effective over a first torsional range, and the inner force storer being also effective over a succeeding torsional range.

3. Clutch disk assembly according to claim 1 wherein the part of the cutouts and said stop contours formed in the two lateral disks wherein the inner force storer is disposed, as viewed in circumferential direction of the clutch disk assembly, is longer than the corresponding part of the cutouts formed in the disk-like member disposed in the axial space between the two lateral disks.

4. Clutch disk assembly according to claim 3 wherein the part of the cutouts formed in the two structural units wherein the inner force storer is disposed, as viewed in circumferential direction of the clutch disk assembly, has a length that is at least as great as the length of the inner force storer under maximal compression thereof.

5. In a clutch disk assembly having two structural units formed with window-shaped cutouts, at least two coaxially disposed force-storage devices received in the cutouts and braced against the structural units so as to afford limited torsional play of the structural units relative to one another, one of the structural units including two lateral disks mutually spaced-apart from one another in axial direction of the clutch disk assembly, the other of the structural units including at least one disk-like member disposed in the axial space between the two lateral disks, the two force storage devices comprising a radially inner and a radially outer force storer, the radially inner force storer extending along the length of the radially outer force storer and, as viewed in circumferential direction of the lateral disks, having a portion thereof projecting beyond at least one end of the radially outer force storer, the cutouts being defined by contour portions of the two structural units conforming both to the radially outer force storer as well as to the portion of the radially inner force storer projecting beyond the end of the radially outer force storer, the contour portions of the two structural units forming a guide both in axial and radial direction for both of the force storers, the contour portions of the two structural units located at the radially outer sides of the window-shaped cutouts being formed on at least one of the two lateral disks with vanes extending away from the respective lateral disk, said vanes including at least one radially farther outwardly disposed vane converging toward the outer force storer and at least one radially farther inwardly disposed vane converging toward the projecting portion of the inner force storer.

* * * * *